Patented Mar. 13, 1951

2,545,430

UNITED STATES PATENT OFFICE 2,545,430

FLUORINATION OF UNSATURATED HALO-CARBONS WITH LEAD TETRAFLUORIDE

Earl T. McBee, La Fayette, Ind., and Richard M. Robb, Wilmington, Del., assignors to Purdue Research Foundation, La Fayette, Ind., a corporation of Indiana No Drawing. Application December 22, 1945, Serial No. 637,073

5 Claims. (Cl. 260—653)

This invention relates to organic compounds containing fluorine, particularly to saturated fluorine-containing halocarbons, and to a method for the preparation thereof. This application is a continuation in part of application Serial No. 552,016, filed August 30, 1944, now Patent 2,533,132, Serial No. 568,939, filed December 19, 1944, and Serial No. 572,257, filed January 10, 1945, now abandoned.

The preparation of fluorine-containing organic compounds, such as saturated fluorine-containing halocarbons, has, in most instances, heretofore been attended with considerable difficulty. It is well known that elemental fluorine generally may not be reacted with organic compounds and the reaction controlled so as to produce a desired fluorine-containing compound. Although certain halogens other than fluorine, e. g., chlorine and bromine, may react with a wide variety of organic compounds under suitable conditions to give high yields of valuable products, the reaction of fluorine with most organic compounds, including unsaturated halocarbons, is violent in nature and is usually accompanied by profound decomposition of the organic compound. In most cases, reaction occurs with explosive violence in spite of extreme measures which may be taken to moderate its effect. In many instances, the reaction products consist mainly of carbonaceous matter or of other equally undesirable products. When using a large excess of fluorine, the principal product is generally carbon tetrafluoride.

Many attempts have been made to use fluorinating agents other than elemental fluorine to replace hydrogen or halogen in organic compounds to obtain desired fluorine-containing compounds, e. g., saturated fluorine-containing halocarbons. Among the fluorinating agents which have been tried, may be mentioned hydrogen fluoride, antimony trifluoride, mercuric fluoride, iodine pentafluoride, bromine trifluoride, chlorine trifluoride, and many others. Although certain of these agents may, under certain conditions, replace with fluorine an existing halogen atom other than fluorine already in the organic molecule, little success has been reported in attempting to replace hydrogen with fluorine using these agents. For this reason, it is usually necessary as a step preliminary to the preparation of a desired saturated fluorine-containing halocarbon to prepare the corresponding chlorine-, bromine- or iodine-containing compound. This renders processes using these fluorinating agents unduly complicated and, also, the requisite chlorine-, bromine- or iodine-containing compound may not always be prepared readily. Furthermore, highly fluorinated compounds, e. g., perfluoro compounds, are not usually obtained readily from the corresponding highly chlorinated, brominated or iodinated compounds using such agents. Certain of the agents referred to, e. g., the halogen fluorides, react with many organic compounds with explosive violence.

Most metal fluorides heretofore proposed as agents to replace chlorine, bromine or iodine in organic compounds with fluorine tend, under the conditions necessary to obtain a high degree of halogen exchange to produce polymerized or unsaturated break-down products. For these and other reasons, fluorine-containing saturated halocarbons have not heretofore been available except in a few instances, and industry has been deprived of many members of this valuable group of compounds. The need for new and improved procedures for the preparation of fluorine-containing saturated halocarbons is evident.

It is therefore an object of the present invention to provide a method for the preparation of a saturated fluorine-containing halocarbon.

A further object is to provide a novel fluorinating agent capable of converting an unsaturated halocarbon into a saturated fluorine-containing halocarbon.

An additional object is to provide a method whereby a fluorine-containing saturated halocarbon may be prepared from an unsaturated halocarbon containing two or more different halogens.

An additional object is to provide a method for preparing a fluorine-containing saturated halocarbon whereby the formation of undesirable decomposition or polymerization products is substantially avoided.

An additional object is to provide a method for fluorinating an unsaturated halocarbon whereby a predetermined degree of fluorination, including perfluorination, may be effected readily.

An additional object is to provide a fluorination method which is not subject to certain of the disadvantages set forth above.

Still an additional object is to provide certain new and novel fluorine-containing saturated halocarbons, including fluorocarbons.

Other objects will become apparent from the following specification and claims.

According to the present invention, the foregoing and related objects are accomplished readily and economically by contacting an unsaturated halocarbon with lead tetrafluoride under suitable reaction conditions until a desired degree of fluorination is effected. Lead tetrafluoride has been found to be an excellent fluorinating agent for unsatuarted halocarbons, and when the fluorination reaction is carried out under conditions hereinafter described, the reaction can be controlled without difficulty. Substantially, any desired proportion of the maximum theoretical amount of fluorine can be introduced into an unsaturated halocarbon molecule with the formation of little or no decomposition or polymerization products. Aromatic and unsaturated aliphatic, and alicyclic halocarbons, including fused-ring unsaturated halocarbons and polycarbocyclic non-fused-ring unsaturated halocarbons, can be converted readily to saturated fluorine-containing halocarbons.

Unsaturated halocarbons such as tetrachloroethylene, tetrabromoethylene, dibromodichloroethylene, dichlorodifluoroethylene, decachlorocyclohexene, octachlorobutylene, hexachlorobenzene, octachlorotoluene, decachlorobiphenyl, pentachlorobenzotrifluoride and tetrabromohexachloronaphthalene can be fluorinated readily, usually first with at least a partial addition of fluorine atoms at the points of unsaturation and, if desired, with the replacement of halogen other than fluorine in the molecule, and the production of saturated fluorine-containing halocarbons.

Examples of halocarbons containing at least one halogen other than fluorine which can be prepared by the method of the invention include tetrachlorodifluoroethane, dichlorotetrafluoroethane, monobromomonochlorotetrafluoroethane, monobromopentafluoroethane, dichlorodecafluorocyclohexane, dichlorotetradecafluoroheptane, pentafluoromonoiodoethane, tetrachlorooctafluorocyclohexane, and many others.

According to one modification of the present invention, perfluorination may be accomplished and perfluoro compounds may be obtained by contacting an unsaturated halocarbon with lead tetrafluoride as an active fluorinating agent under such conditions and for such time that all halogen other than fluorine in the molecule is replaced by fluorine. In most instances, unsaturated carbon-carbon bonds in the molecule are saturated by the addition of fluorine during such perfluorination. Examples of such perfluoro compounds are hexafluoroethane, dodecafluoropentane, dodecafluorocyclohexane, perfluoromethylcyclohexane, perfluorobicyclohexyl, perfluoronaphthalene, and the like.

In certain instances, rupture of the molecule may be effected with the formation of saturated fluorine-containing halocarbons having fewer carbon atoms in the molecule than does the original halocarbon fluorinated. This is herein referred to as fluorinolysis. Thus, for example, high molecular weight unsaturated halocarbons may be converted largely to high molecular weight fluorine-containing saturated halocarbons, to high molecular weight saturated fluorocarbons, i. e., to saturated compounds containing only carbon and fluorine, or under more vigorous conditions, to compounds having fewer carbon atoms in the molecule, such as hexafluoroethane and even carbon tetrafluoride, if desired.

Although the fluorination reaction is exothermic, it proceeds without explosive violence and may be controlled readily so as to produce a product containnig substantially any desired proportion of the theoretical amount of fluorine. The fluorination reaction is carried out at a temperature between about 0° C., or somewhat lower and about 500° C., or somewhat higher, preferably between about 20° and about 450° C. Generally speaking, the addition of fluorine to a carbon-carbon unsaturated bond using lead tetrafluoride as the active fluorinating agent occurs at a somewhat lower temperature than does the replacement with fluorine of a hydrogen or halogen other than fluorine. This, however, is not always the case. It has also been observed that the optimum temperature for the introduction of a fluorine atom into an organic molecule increases somewhat as the number of fluorine atoms in the organic molecule is increased. It follows that the actual fluorination temperature employed will depend to some extent upon the organic compound fluorinated and the degree of fluorination desired.

During the course of the reaction, the lead tetrafluoride used as a fluorinating agent is converted to lead difluoride from which lead tetrafluoride may be regenerated readily by exposing the difluoride to elemental fluorine at an elevated temperature. The reaction may thus be carried out in cyclical manner, the lead tetrafluoride being first contacted with an unsaturated halocarbon to produce a desired fluorine-containing saturated halocarbon and the spent lead tetrafluoride, consisting largely of lead difluoride, then regenerated with elemental fluorine and the cycle repeated. Furthermore, it may be desirable in some instances when a highly fluorinated product is desired, to effect only partial fluorination in the first passage of the unsaturated halocarbon through the fluorination reactor and then to recycle the fluorine-containing product over fresh or regenerated lead tetrafluoride to increase the proportion of fluorine in the organic molecule. Recycling of the fluorine-containing product and of the lead fluoride may, if desired, be continued until perfluorination is effected, the final product being substantially free of unsaturated carbon-carbon linkages and of chlorine, bromine and iodine.

Lead tetrafluoride is a solid which is unstable in the presence of water or atmospheric moisture. The compound is substantially stable when dry at temperatures as high as 500° C. and higher. Lead tetrafluoride may be prepared readily in a number of ways, one convenient way being by the treatment of anhydrous lead difluoride with elemental fluorine at an elevated temperature, e. g., at temperatures above about 150° C., preferably at a temperature between about 250° and about 500° C. Lead difluoride may be prepared readily by treating anhydrous lead dichloride with hydrogen fluoride or fluorine at temperatures above about 150° C., and in many other ways.

In practicing the invention, it has been found convenient to place anhydrous lead dichloride in the reaction vessel in which the subsequent fluorination of an unsaturated halocarbon is to be carried out, and then to treat the lead dichloride in the vessel first with hydrogen fluoride and then with elemental fluorine, or with elemental fluorine alone, under the said requisite conditions of temperature. Following the fluorination of an unsaturated halocarbon, the spent lead tetrafluoride, which contains a large proportion of lead difluoride may be regenerated and the difluoride reconverted to the tetrafluoride by contacting it with elemental fluorine at an elevated temperature. In this way, the process may be carried out in cyclic manner, the lead fluorides being treated alternately with an unsaturated halocarbon and with elemental fluorine. Thus, the consumption of lead salts in the process is reduced to a minimum and consists only of such negligible quantities as may be lost mechanically during the process.

Fluorination of an unsaturated halocarbon with lead tetrafluoride may be caried out in any convenient manner and in any convenient type of apparatus. It has been found satisfactory to dispose the lead tetrafluoride in a thin layer, e. g., in a layer from about one-half to about one inch thick, on shelves or trays within the reaction vessel or directly on the floor of the vessel itself and to pass an unsaturated halocarbon in vapor form through the vessel. The process is frequently carried out by distributing a shallow layer of lead tetrafluoride throughout the length of a metal tube and passing an unsaturated halocarbon in vapor form through the tube. If desired, tubes with rectangular cross section may be used and the exposed surface of the layer of lead tetrafluoride thus increased. The mass may be agitated, if desired. The physical form of the lead tetrafluoride is preferably such that easy penetration of the mass of tetrafluoride by gases or vapors passing through the reaction vessel is facilitated. Granulated or coarsely powdered lead tetrafluoride has been found to be satisfactory.

The reaction vessel, which may be of iron, nickel or other material resistant to the reactants and reaction products under the conditions of fluorination and regeneration, is maintained at a desired reaction temperature by any convenient means. Heating may be effected in any one of a number of ways, such as by electrical resistance heaters, by gas flames, or by immersing the reaction vessel in a suitable high-boiling liquid, such as a low-melting alloy. The fluorination reaction is exothermic in nature and in large size reaction vessels heating may not be necessary after the reaction has started. In some instances, cooling may even be advisable.

Fluorination of an unsaturated halocarbon with lead tetrafluoride may be carried out with the unsaturated halocarbon in either liquid or gaseous phase. In practice, however, it has usually been found more convenient, especially when high temperatures are required, to pass the unsaturated halocarbon through the reactor in vapor form. In this way the handling of organic liquids at high temperatures is avoided and the reaction may be carried out at ordinary pressures. The unsaturated halocarbon may be introduced into the reaction vessel either in the form of its vapor or as a liquid. In the latter instance, the unsaturated halocarbon is usually vaporized in the portion of the reaction vessel nearest the entry port and the vapors are then fluorinated as they pass through the remaining part of the vessel.

In certain instances, the halocarbon reactant may be heated in a vessel separate from the fluorination vessel, a stream of inert gas, such as nitrogen, hydrogen fluoride, or helium, passed through the heated liquid, and the mixed vapors of inert gas and of halocarbon reactant then passed into the fluorination vessel. Fluorination with the halocarbon reactant in the vapor phase is conveniently carried out at atmospheric pressure although it may, if desired, be carried out at a pressure higher or lower than atmospheric pressure.

Although fluorination of an unsaturated halocarbon in the vapor phase using lead tetrafluoride as the active fluorinating agent is usually carried out at a temperature between about 0° C., and about 500° C., it may be carried out at any convenient temperature above the condensing temperature of the vapors at the reaction pressure. In certain instances, the temperature of fluorination may even be maintained sufficiently high to cause fluorinolysis. Temperatures sufficiently high to cause the formation of substantial amounts of undesirable by-products are to be avoided.

After the lead tetrafluoride has been largely exhausted and converted substantially to lead difluoride the reaction vessel may be purged with nitrogen or other inert gas to free it from most of the organic substances before elemental fluorine is admitted to the reaction vessel to regenerate lead tetrafluoride. In this way, the possible explosive reaction of residual organic vapor with elemental fluorine within the reaction vessel is avoided. Regeneration of the spent lead tetrafluoride is, as noted above, carried out at a temperature above about 150° C., preferably at a temperature between about 250° C. and about 500° C.

As mentioned previously, the process of the invention may, if desired, be carried out with the unsaturated halocarbon reactant in the liquid phase in which case the halocarbon and lead tetrafluoride may be mixed together in any convenient way, e. g., the halocarbon may be stirred in a vessel at the desired temperature and lead tetrafluoride added gradually thereto. Such procedure with the halocarbon reactant in the liquid phase is of particular value when the halocarbon reactant boils at a high temperature. It has been found that the ratio of the amount of lead tetrafluoride to the amount of halocarbon reactant necessary when a high degree of fluorination is to be effected is so great that when the reaction is carried out with the halocarbon reactant in liquid phase the final reaction mixture is frequently of a moist granular nature rather than of a fluid nature and is difficult to handle on a large scale. This difficulty may be overcome in a number of ways. Thus the liquid which is to be fluorinated may be diluted with a liquid inert under the reaction conditions, such as a high boiling fluorocarbon, to increase the proportion of liquid in the reaction mixture.

Alternatively, fluorination in the liquid phase may be carried out step-wise. Thus in the first step the addition of solid lead tetrafluoride to the liquid halocarbon reactant may be stopped while the mixture is still fluid enough to be agitated readily. The reaction product may be filtered or otherwise treated to separate the organic and inorganic portions thereof, the spent lead tetrafluoride regenerated with fluorine, and the partially fluorinated organic portion then fluorinated further by adding to it fresh or regenerated lead tetrafluoride. Although the invention is not limited to vapor phase procedures, it is readily apparent that in many instances the fluorination reaction is more conveniently carried out in vapor phase.

The degree of fluorination effected is dependent, among other factors, upon the reaction temperature and the time of contact of the halocarbon reactant with lead tetrafluoride. In order to effect a high degree of fluorination, e. g., perfluorination, of an unsaturated halocarbon in the vapor phase during a single pass through the reaction vessel, it may be necessary to pass the reactant vapor very slowly through the vessel thus limiting the rate at which a highly fluorinated product may be produced in any particular reaction vessel. It has also been found that many unsaturated halocarbons are somewhat more thermally unstable in the unfluorinated or only lowly fluorinated state than when they are more highly fluorinated and that, when it is attempted to fluorinate such unfluorinated or lowly fluorinated substances to produce a a highly fluorinated substance during a sigle pass of the vapor through the fluorination vessel, it may be necessary to elevate the temperature to such a degree that undesirable decomposition of the halocarbon reactant may occur before substantial fluorination is effected.

For these and other reasons, it is sometimes convenient and desirable to recycle the halocarbon reactant after it has been partially fluorinated, usually after the spent lead tetrafluoride has been regenerated to insure there being a high proportion of lead tetrafluoride in the lead fluoride mass. This recycling of the halocarbon product may be repeated as many times as is desirable or necessary to introduce the desired proportion of fluorine into the molecule and each recycling is preferably, but not necessarily, carried out at a temperature higher than the preceding one. In this way the first stages of fluorination, which do not require high temperatures and during which relatively unstable organic compounds may be present in the fluorination vessel, are carried out at a relatively low temperature while later stages of fluorination, which usually require a higher temperature and during which only relatively stable fluorine-containing substances are present in the fluorination vessel, are carried out at a higher temperature. The same effect may be obtained by passing the unsaturated halocarbon reactant through a number of reaction vessels or towers in series each containing lead tetrafluoride and each maintained at a reaction temperature which may, if desired, be higher than that of the preceding vessel. By a suitable arrangement of a number of reaction vessels in series, the process may be carried out continuously, it being only necessary to by-pass the vapors of the halocarbon reactant around any one of the reaction vessels while the spent lead tetrafluoride therein is being regenerated with fluorine.

It is to be noted that when the fluorination involves the replacement of a chlorine, a bromine or an iodine atom with a fluorine atom, replaced halogen appears in the reaction product in elemental form. When, however, the only reaction involved is the addition of fluorine to an unsaturated carbon-carbon bond, elemental halogen does not appear in the reaction product. The effluent vapors from the reaction may thus, depending upon the substances fluorinated, contain, in addition to the desired saturated fluorine-containing halocarbon, a halogen other than fluorine together with unfluorinated or partially fluorinated halocarbon reactant. In most instances, replacement of a chlorine, bromine or iodine atom with fluorine is preceded by addition of fluorine to unsaturated carbon-carbon bonds in the unsaturated halocarbon molecule.

The reaction product may be treated in any convenient manner to recover therefrom the desired fluorination product. One convenient way in the case of vapor phase fluorination consists in cooling and condensing the effluent vapors and treating the condensed liquid to separate therefrom the fluorine-containing saturated halocarbon. Thus the condensed liquid may be fractionally distilled and the desired fraction collected, or it may be treated directly with water and, subsequently, with a dilute aqueous alkali to free it from elemental halogen and then fractionally distilled. In any event, the desired fluorine-containing fraction may be collected and less highly fluorinated fractions may, if desired, be recycled to the fluorination reaction vessel to increase the proportion of fluorine in the fraction.

In the case of fluorination with the halocarbon reactant in the liquid state, the reaction mixture may be filtered or otherwise treated to separate the organic and inorganic constituents. The inorganic constituents, consisting mainly of spent lead tetrafluoride, may be dried, or washed with a low boiling organic liquid and dried, and then regenerated with elemental fluorine and recycled in the process. The organic constituents may be washed with water and with dilute aqueous alkali to free them from elemental halogen, and the mixture then fractionally distilled. Inert liquid diluents and insufficiently fluorinated organic substances collected during the distillation may be returned, either together or separately, to the fluorination vessel and the fluorine content of the insufficiently fluorinated portion increased by further treatment with fresh or regenerated lead tetrafluoride. Other ways of recovering the desired fluorination product from the reaction mixture will be apparent to those familiar with the art and the present invention is not limited as to such methods of recovery.

Certain advantages of the invention may be seen from the following examples, which are given by way of illustration only and are not to be construed as limiting.

*Example 1*

An iron tube fitted with means for heating at any desired temperature was packed loosely with several mols of lead dichloride. The tube and contents were heated at about 300° C. and anhydrous hydrogen fluoride passed through the tube for several hours. Elemental fluorine was then passed through the tube for several hours until the gases issuing from the tube contained a high proportion of fluorine. The lead dichloride in the tube was thus converted almost entirely to lead tetrafluoride. The lead tetrafluoride was used without removal from the tube for fluorinating unsaturated halocarbons containing at least one atom of halogen other than fluorine.

*Example 2*

Tetrachlorethylene was vaporized and passed slowly through a fluorination reactor containing lead tetrafluoride similar to that described in Example 1 and heated at 225° to 250° C. The effluent vapors from the reactor were conducted through a receiver cooled sufficiently to condense substantially all of the organic vapors contained therein. The liquid condensate was washed with dilute alkali and fractionally distilled. Substantial fractions of tetrachlorodifluoroethane and dichlorotetrafluoroethane were obtained.

*Example 3*

One hundred forty-two grams of hexachlorobenzene was vaporized in a slow stream of nitrogen and the mixed vapors passed through a reactor containing lead tetra fluoride heated at about 300° C. The organic reaction product was collected in a cooled receiver, washed with dilute alkali and fractionally distilled. A substantial fraction of trichlorononafluorocyclohexane was thus obtained.

*Example 4*

Dichlorooctafluorocyclohexane is fluorinated by passing it slowly in vapor form through a fluorination reactor containing lead tetrafluoride heated at about 300° C. The product is collected and purified as in Example 3. The purified product consists almost entirely of dichlorodecafluorocyclohexane, monochloroundecafluorocyclohexane, and perfluorocyclohexane.

*Example 5*

A reactor containing several mols of lead tetrafluoride similar to that described in Example 1 was heated at about 225° C. and 249 grams of hexachloropropene passed in vapor form through the reactor. About five hours was occupied in this operation. The reactor was then purged with a slow stream of nitrogen for about one and one-half hours. The reaction product was condensed in a receiver cooled with solid carbon dioxide. The condensate was washed thoroughly with dilute sodium hydroxide solution and the washed product, which weighed 147 grams, was rectified. Four fractions were collected and analyzed for chlorine and fluorine. The first fraction, which weighed ten grams and boiled at 33° to 35° C., contained 34.3 per cent chlorine and 52.1 per cent fluorine. This analysis corresponds to dichlorohexafluoropropane. The second fraction, which weighed 46 grams and boiled at 72° to 74° C., contained 46.1 per cent chlorine and 40.2 per cent fluorine and was a trichloropentafluoropropane. The third fraction, which weighed fifteen grams and boiled at 90° to 92° C., contained 62 per cent chlorine and 24.7 per cent fluorine. This fraction appeared to be a mixture of tetrachlorodifluoroethane and trichlorotrifluoropropene. The fourth fraction, which weighed ten grams and boiled at 110° to 111° C., contained 57.1 per cent chlorine and 30.2 per cent fluorine, corresponding closely to tetrachlorotetrafluoropropane.

*Example 6*

A reactor containing lead tetrafluoride was provided and 261 grams of hexachlorobutadiene was fluorinated with the lead tetrafluoride at 225° C. in a manner similar to that described in Example 5. The product, after condensing, washing and drying, weighed 216 grams. The product was distilled and a fraction collected which weighed 68 grams, boiled at 60° to 62° C. and contained 27.4 per cent chlorine and 56.4 per cent fluorine. This analysis corresponds to a dichlorooctafluorobutane. Another fraction which was collected, weighed 42 grams and boiled at 95° to 97° C. This fraction appeared to be a trichloroheptafluorobutane.

We claim:

1. The method for the perfluorination of an unsaturated halocarbon containing at least one halogen other than fluorine in the molecule to saturate, with fluorine, double bonds of the unsaturated halocarbon and to replace, with fluorine, all halogen other than fluorine in the unsaturated halocarbon, with retention of the carbon structure of the starting unsaturated halocarbon, the steps which include (1) vaporizing an unsaturated halocarbon containing at least one halogen atom other than fluorine, (2) maintaining lead tetrafluoride in a reaction zone at a temperature between about 20 and 500 degrees centigrade, (3) causing the unsaturated halocarbon and lead tetrafluoride to react in the reaction zone at the said temperature with saturation, with fluorine, of at least one double bond in the unsaturated halocarbon, and with replacement, with fluorine, of all halogen other than fluorine in the unsaturated halocarbon, and (4) condensing from the effluent product a halocarbon having the carbon structure of the starting halocarbon wherein at least one double bond has been saturated with fluorine and wherein all halogen other than fluorine has been replaced with fluorine.

2. The process of claim 1, wherein the starting halocarbon is an aromatic halocarbon.

3. The process of claim 1, wherein the starting halocarbon is a cycloaliphatic halocarbon.

4. The process of claim 1, wherein the starting halocarbon is an aliphatic halocarbon.

5. The process of claim 1, wherein the reaction temperature is between about 225 and 500 degrees centigrade.

EARL T. McBEE.
RICHARD M. ROBB.

REFERENCES CITED

The following references are of record in the file of this patent:

UNITED STATES PATENTS

| Number | Name | Date |
|---|---|---|
| 2,004,932 | Daudt et al. | June 18, 1935 |
| 2,013,035 | Daudt et al. | Sept. 13, 1935 |
| 2,024,008 | Midgley et al. | Dec. 10, 1935 |
| 2,062,743 | Daudt et al. | Dec. 1, 1936 |
| 2,192,143 | Midgley et al. | Feb. 27, 1940 |
| 2,220,713 | Grosse et al. | Nov. 5, 1940 |
| 2,238,242 | Balon et al. | Apr. 15, 1941 |
| 2,423,045 | Passino et al. | June 24, 1947 |

FOREIGN PATENTS

| Number | Country | Date |
|---|---|---|
| 214,293 | Great Britain | Apr. 14, 1924 |
| 3141/31 | Australia | Jan. 20, 1933 |
| 429,591 | Great Britain | May 28, 1935 |
| 786,123 | France | June 3, 1935 |

OTHER REFERENCES

Henne et al., J. A. C. S., vol. 63, pages 3478–3479 (1941).

Dimroth et al., Ber. deutsch. chem. Ges., vol. 64, pages 516–522 (1931).

Wartenberg, Zeitschr. anorg. allgem. chem., vol. 244, pages 337–347 (1940).

Moissan "Comptes rendus," vol. 130, pages 622–627 (1900).

Ruff and Giese, "Zeit. Anorg. Allgem. Chem.," vol. 219, pages 143 to 148 (1934).